Jan. 21, 1941.    J. R. GOSSER    2,229,290
EARTH WORKING MACHINE
Filed April 29, 1939    2 Sheets-Sheet 1
FIGURE 1
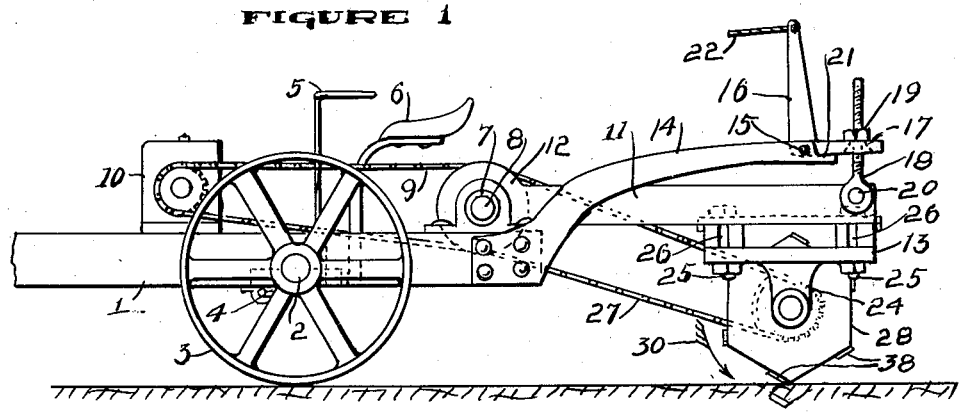
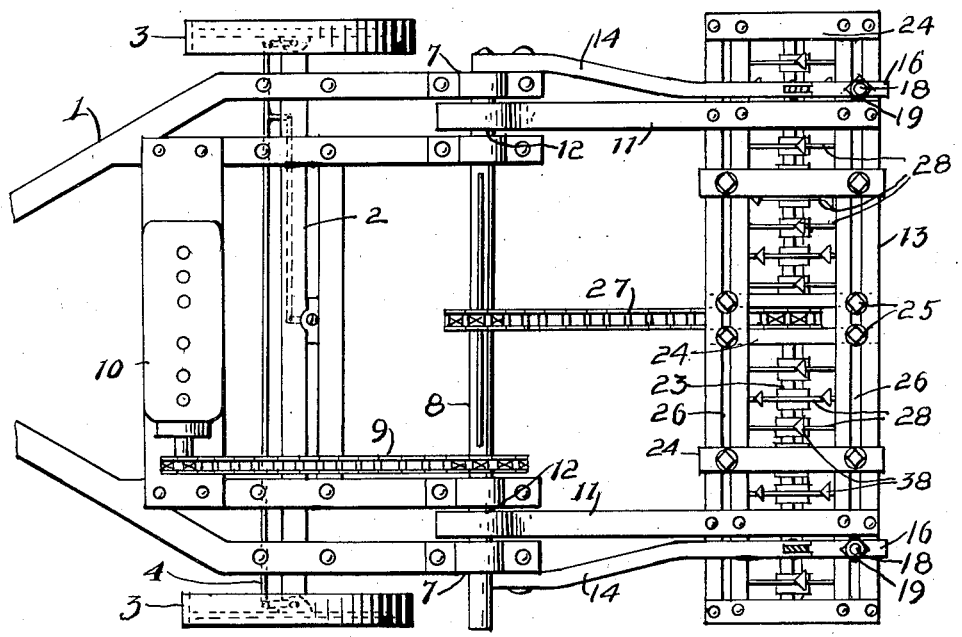
FIGURE 2
INVENTOR
John R. Gosser
John A. Naismith
ATTORNEY Jan. 21, 1941. J. R. GOSSER 2,229,290
EARTH WORKING MACHINE
Filed April 29, 1939 2 Sheets-Sheet 2
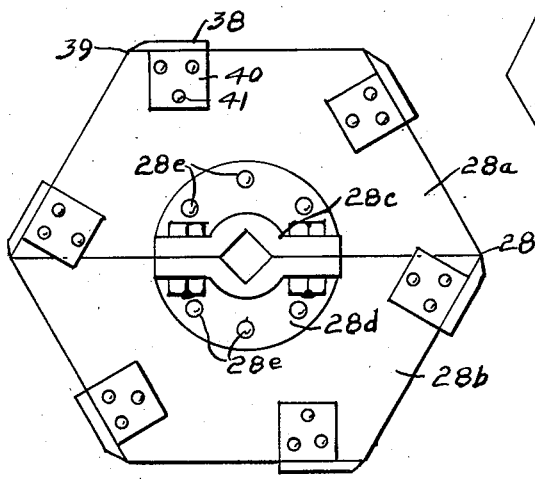
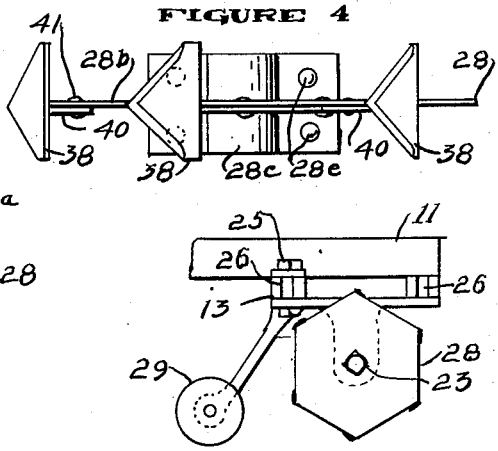
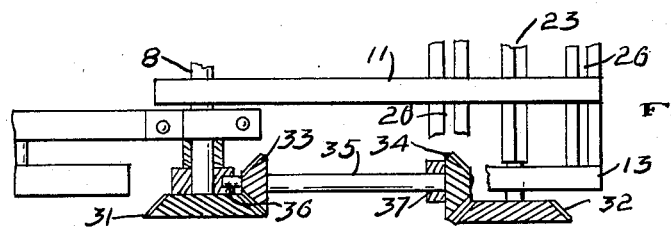
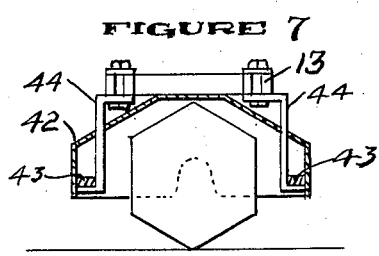
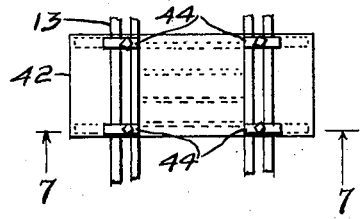
INVENTOR
John R. Gosser
John A. Naismith
ATTORNEY Patented Jan. 21, 1941

2,229,290

UNITED STATES PATENT OFFICE 2,229,290

EARTH WORKING MACHINE

John R. Gosser, Holt, Calif.

Application April 29, 1939, Serial No. 270,806

3 Claims. (Cl. 97—212)

In growing such crops as sugar beets, asparagus, lettuce, and similar vegetables, it is not only necessary to properly prepare the soil before planting operations are begun, but it is also necessary to work the soil between the plant rows at various stages of their growth. To accomplish this work with reasonable dispatch and economy is a serious problem on the larger western ranches. In addition to the great variety of soils encountered is the fact that the rows of one type of plants are differently spaced than the rows of other types, and that the spacing of the rows of any one given type of plant varies in different localities. Furthermore, the soil may be worked closer to the rows in some crops than in others, and the depth of the working must be adjusted to meet requirements.

It is one object of the present invention to provide a machine that may be readily adapted for use on any kind of soil, and readily adjusted to work the soil to any desired depth, and between rows of any spacing.

It is also an object of the invention to provide a machine of the character indicated wherein rotating discs are fitted with cutting blades in such a manner as to effectually prevent material of any kind from entangling therewith.

It is a further object of the invention to provide a machine of the character indicated that will be economical to manufacture, exceptionally strong and durable, easily and simply operated, adjusted and controlled, and highly efficient in its practical application.

In the drawings:

Figure 1 is a side elevation of a machine embodying my invention, parts being broken away.

Figure 2 is a plan view of the same.

Figure 3 is an enlarged side elevation of one of the rotary discs.

Figure 4 is a top plan view of the disc shown in Figure 3.

Figure 5 is a side elevation of a portion of the machine when fitted with a coulter.

Figure 6 is a plan view of a portion of the machine illustrating a means for reversing the direction of rotation of the discs, the said means being partly shown in section.

Figure 7 is a sectional view on line 7—7, Figure 8.

Figure 8 is a plan view of a portion of the machine showing a guard over a group of discs.

In the particular embodiment of the machine illustrated the main frame is indicated generally at 1 mounted on an axle 2. On axle 2 are rotatably mounted wheels 3, steering being accomplished by conventional steering mechanism as at 4 with the steering arm 5 placed adjacent the seat 6 on frame 1.

Paralleling the axle 2 and rotatably mounted on the rear of frame 1 as at 7 is a shaft 8, this shaft being driven by means of a chain drive 9 to an engine 10 on the frame 1.

At 11—11 are a pair of parallel rearwardly extending arms pivotally mounted on the shaft 8 as at 12 and having a gang frame 13 fixedly mounted on their outer ends as shown, in parallel relation to shaft 8.

At 14—14 are rearwardly projecting beams fixedly mounted on frame 1 with their free ends elevated above the frame 13. On the free end of each beam is pivotally mounted at 15 a bell crank 16. The short arm of the bell crank is provided with a slot 17 through which passes a screw 18 fitted with an adjustable nut at 19 and pivotally connected ot the adjacent arm 11 at 20. The stop at 21 limits movement of the bell crank in one direction, but it may be moved in the other direction by a pull cable 22. The position of gang frame 13 may therefore be adjusted relative to the ground by means of nut 19, but it may be elevated as desired by the operation of cables 22.

At 23 is shown a square shaft rotatably mounted in hangers 24 on frame 13, certain hangers being adjustable lengthwise of the frame in the conventional manner by means of bolts 25 in slots 26 in the frame. The shaft 23 is driven by a chain drive 27 from shaft 8, the chain drive being shiftable on the shafts to permit adjustment of the several discs as hereinafter described.

Mounted on the shaft 23 are a number of identical discs 28, each disc being built up two sheet metal plates formed to provide a hexagonal periphery as at 28a and 28b, and fitted with opposed clamping members 28c and 28d by means of which they may be clamped to the shaft by suitable bolts as 28e. This construction permits easy adjustment of the disc on the shaft to secure any desired spacing.

Since the hangers 24, the chain drive 27, and the discs 28, are all adjustable on the shaft 23 it follows that the discs may be spaced as desired and arranged in any desired group formation, thereby rendering the one machine adaptable to the requirements of each individual crop.

The machine is drawn by a tractor not shown, and may be fitted with coulters as indicated at 29 whenever such tools are desired, as shown in Figure 5.

While the machine is primarily designed for use in working over the top soil, it may also be easily adapted for use as a plow. In working the top surface of the soil the discs are rotated at high speed in the direction indicated by the arrow 30, but when it is desired to use the machine in plowing the shaft 23 is rotated in the opposite direction. This is accomplished by disconnecting the chain drive 27 and mounting a gear 31 on the end of shaft 8 and a gear 32 on the corresponding end of shaft 23, and drivingly connecting these gears by gears 33 and 34 on a shaft 35 in bearings 36—37.

The discs 28 may be fitted with various types of blades according to the kind of work to be done. For most of the work, however, I employ flat triangular shaped blades as at 38, one of these blades being placed on each of the six sides of the disc to lie in a plane at right angles to the plane of the disc with its point coinciding with the apex of the angle formed at the juncture of two sides, as indicated at 39. A supporting plate 40 is formed integrally with the blade, at right angles thereto, and is bolted to the disc as at 41.

By bringing the point of the blade 38 up to the angle as described and forming it integrally with plate 40, and seating the plate 40 flat against the side of the disc, there are no projections of any kind upon which weeds, or roots, or growths of any kind can catch.

In Figures 7 and 8 I show a structure in which a sheet metal guard is supported over a group of discs to prevent scattering of the soil thrown up by them. This consists of a hood 42 fitted with front and rear bars 43 which seat upon L-shaped hangers 44 on frame 13.

Although certain specific embodiments of the invention have been illustrated and described, it will be understood that various alterations in the details of construction and mode of assembly and operation may be made without departing from the scope of the invention as indicated in the appended claims.

I claim:

1. In an earth working machine, an earth working device comprising a hexagonal disc having blades mounted on its periphery having their cutting edges disposed at the apices of the angles formed at the juncture of each two sides.

2. In an earth working machine, an earth working device comprising a polygonal disc having blades mounted on its periphery with their cutting edges disposed at the apices of the angles formed at the juncture of each two sides.

3. In an earth working machine, an earth working device comprising, a polygonal disc, flat cutting blades having a triangular formation disposed on its periphery with their points disposed at the apices of the angles formed by the juncture of two sides, and lying in planes at right angles to the plane of the disc, each blade having a plate formed integrally therewith and disposed to lie flat against the side of the disc, and rigidly connected thereto.

JOHN R. GOSSER.